United States Patent [19]
Keung

[11] Patent Number: 6,032,834
[45] Date of Patent: Mar. 7, 2000

[54] PUMP DISPENSER AND METHOD OF MAKING IT

[75] Inventor: Wing-Kwong Keung, Perrysburg, Ohio

[73] Assignee: Owens-Illinois Closure Inc., Toledo, Ohio

[21] Appl. No.: 09/176,752

[22] Filed: Oct. 22, 1998

[51] Int. Cl.[7] ..................................................... B67D 5/40
[52] U.S. Cl. ..................... 222/383.1; 239/333; 264/328.1
[58] Field of Search ..................... 222/383.1; 239/333; 264/318, 328.1

[56] References Cited

U.S. PATENT DOCUMENTS

| | | | |
|---|---|---|---|
| 4,161,288 | 7/1979 | McKinney | 239/559 |
| 4,560,095 | 12/1985 | Shew | 222/383.1 X |
| 5,590,834 | 1/1997 | Foster | 239/333 |
| 5,603,434 | 2/1997 | von Schuckmann | 222/383.1 X |
| 5,656,227 | 8/1997 | Foster | 264/328.1 |

*Primary Examiner*—Gregory L. Huson

[57] ABSTRACT

A one-piece molded body and housing unit for a pump dispenser, the housing comprising a pair of spaced side walls and a top wall. A vertical tubular support and pump cylinder are both spaced from the side walls and meet the top wall. Box-like channels are formed in the side walls and support trigger pins, spacing them in from the side walls. The mold includes blades on the upper mold half which extend down through the top wall to form the upper wall of the delivery tube. Additional blades on the upper mold half extend down through the top wall to form the channels and the trigger support pins in cooperation with mold surfaces from the lower half of the mold.

8 Claims, 7 Drawing Sheets

PUMP DISPENSER AND METHOD OF MAKING IT

FIELD OF THE INVENTION

This invention relates to a pump dispenser and method of making it. More specifically, the invention relates to a one-piece pump body and housing of such a dispenser and a process for molding it in a simple two-part mold.

BACKGROUND OF THE INVENTION

In the Foster U.S. Pat. Nos. 5,590,834 and 5,656,227 is disclosed a pump-type dispenser and housing moldea in one piece. It required a three-part mold.

The present invention undertakes to make a one-piece dispenser of the general type as that disclosed in McKinney U.S. Pat. No. 4,161,288 issued Jul. 17, 1979. That dispenser, ubiquitous and well thought of in the industry, features a two-piece housing comprising a housing top and a housing bottom enclosing a pumping chamber/tubular support and delivery tube. The trigger is pivoted to the housing bottom in a slot by pins disposed on opposite side walls of the slot.

The present invention is a one-piece product and a process wherein the trigger pins, delivery tube, pumping chamber, tubular support and external housing are all molded in a simple two-part mold.

SUMMARY OF THE INVENTION

The invention is defined in claims appended hereto. In summary, the invention relates to a one-piece molded body and housing for a pump dispenser, the housing comprising a pair of spaced side walls and a top wall. A vertical tubular support and pumping cylinder are both spaced from the side walls and meet the top wall. A plurality of transverse webs extending between the side wall strengthen the structure, a delivery tube extending forward from an upper portion of the pumping cylinder and spaced down from the top wall. Box-like channels are formed on the inside of the side walls and support coaxial trigger pins, spacing them in from the side walls.

The pump body and housing is formed in a simple two-piece mold which includes blades which extend down through the top wall of the housing to form the upper wall of the delivery tube. Additional blades extend down to form the channels and the trigger pins in cooperation with mold surfaces from the lower half of the mold. The interior of the tubular support and pump cylinder are formed by a cylindrical surface on the lower mold half. The lower half also forms the exterior of the tubular support and cylinder spaced from the inside surface of the side walls. A retractable core pin extends in laterally to meet the cylindrical surface and form the interior of the delivery tube.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
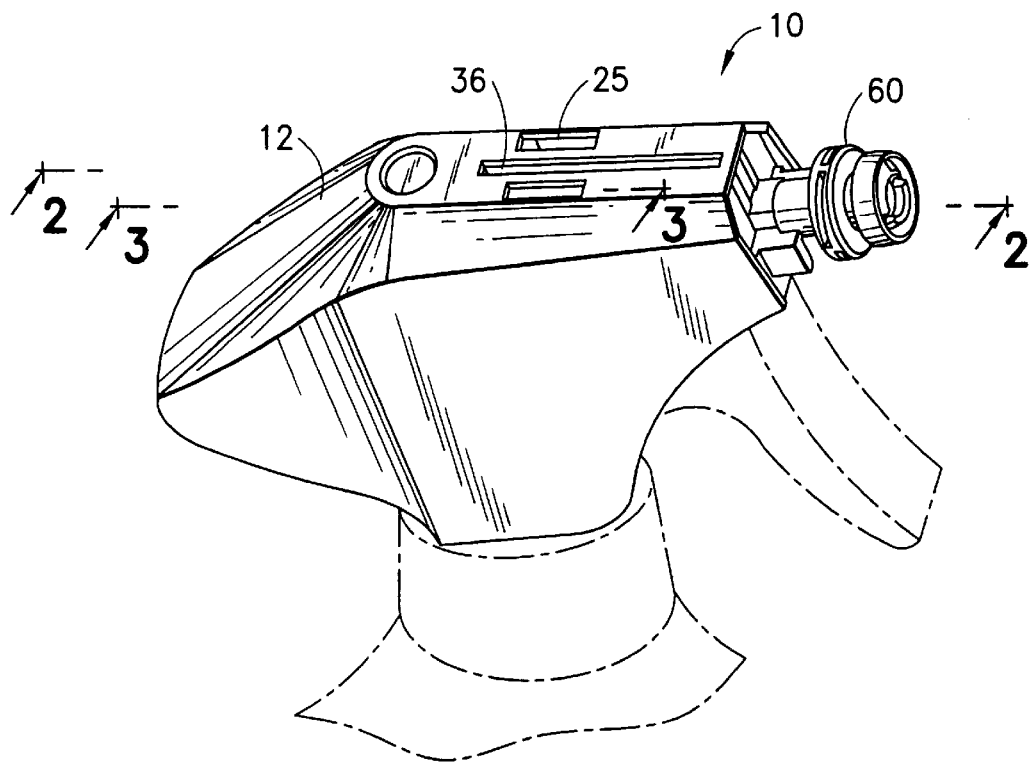
FIG. 1 is a perspective view of a pump dispenser body and housing embodying the invention. Environmental parts are shown in broken lines.
Figure 2:
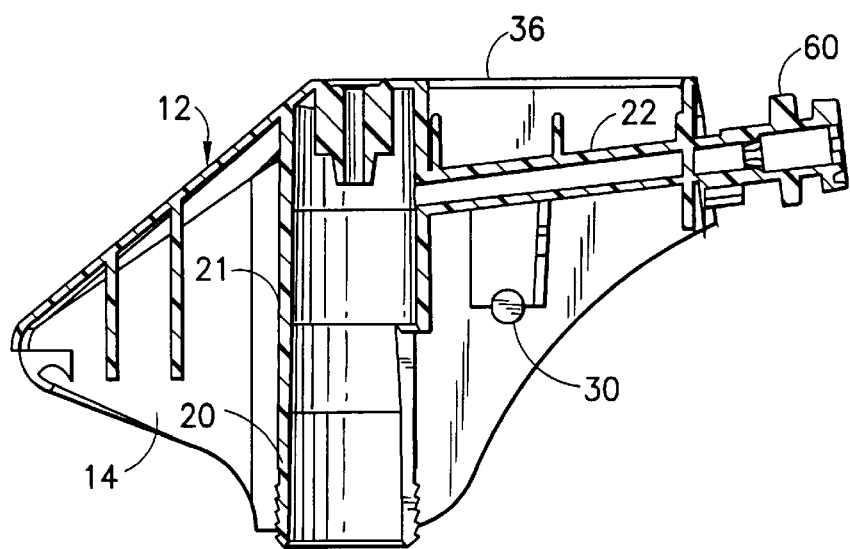
FIG. 2 is a sectional view taken on the line 2—2 on the centerline of FIG. 1.
Figure 3:
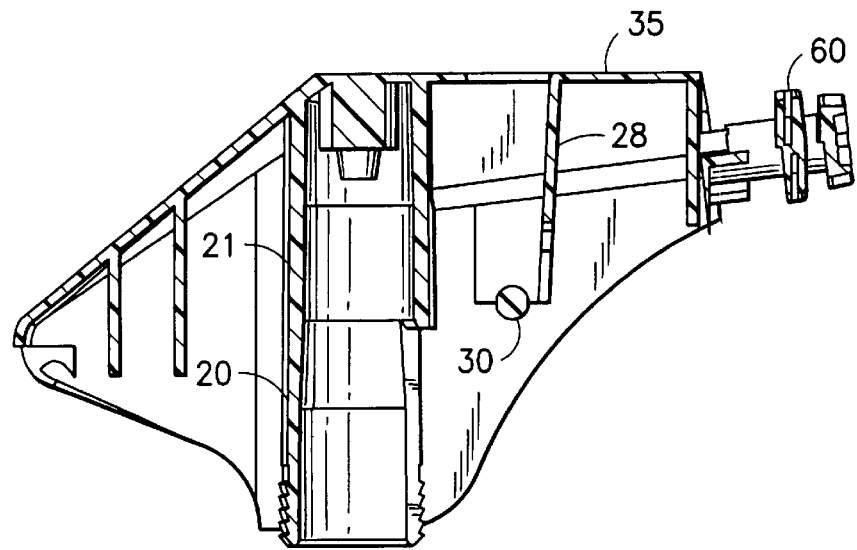
FIG. 3 is a sectional view taken on the line 3—3 of FIG. 1.
Figure 4:
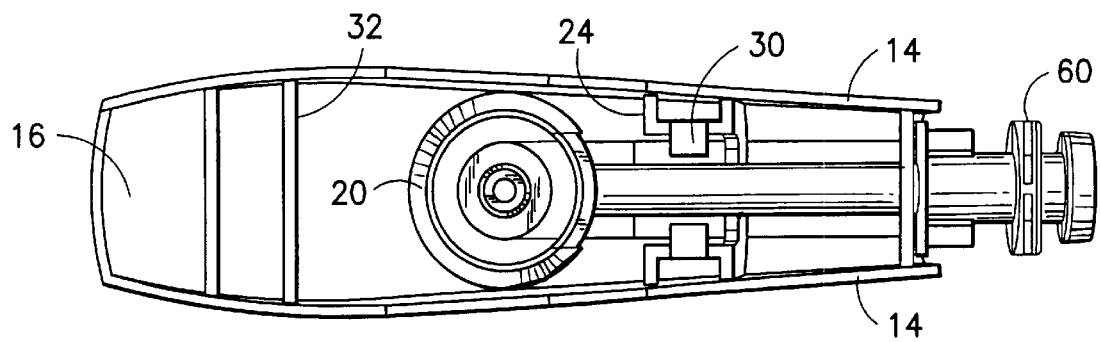
FIG. 4 is an enlarged bottom plan view.
Figure 5:
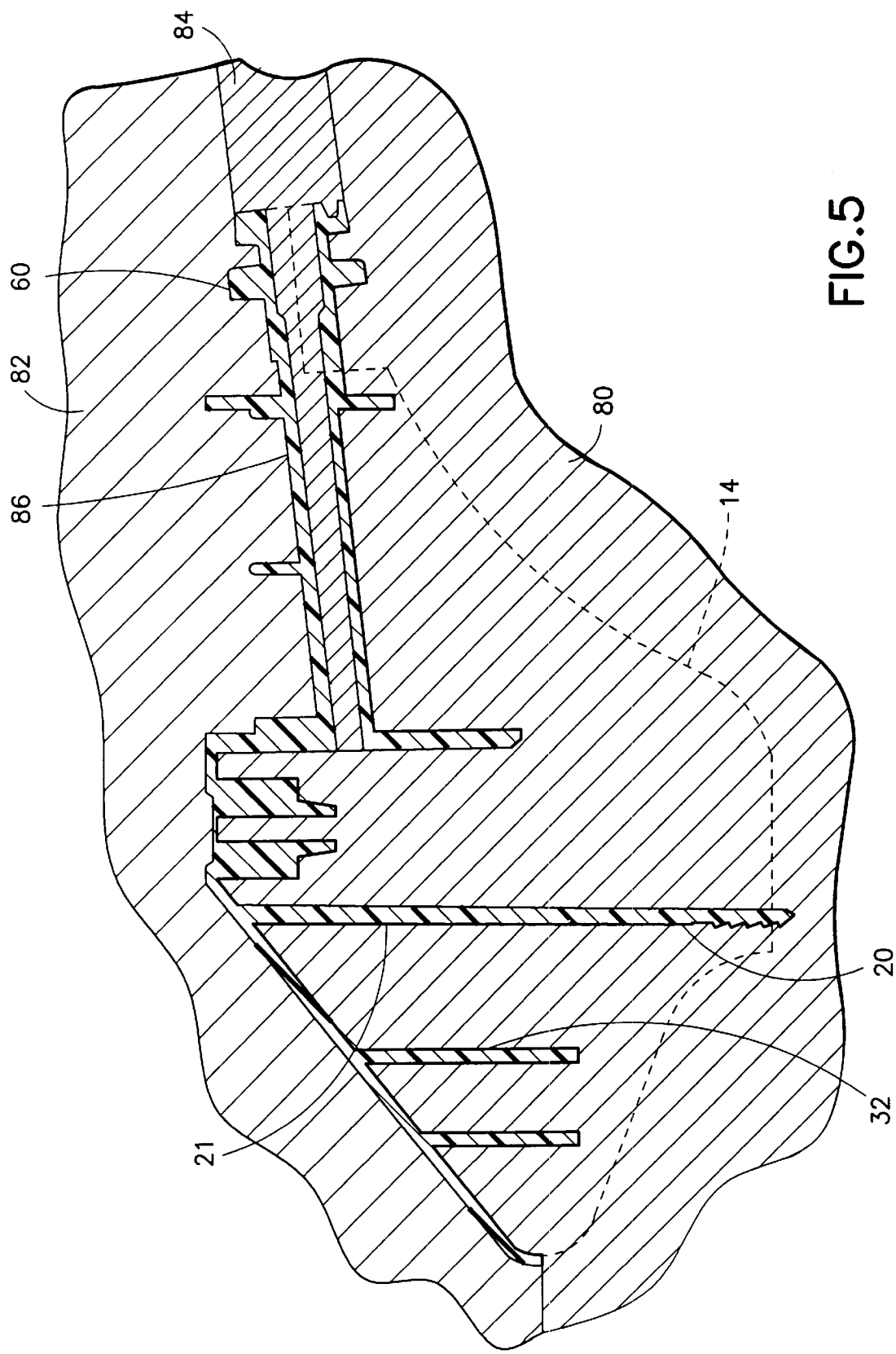
FIG. 5 is an enlarged section comparable to FIG. 2 showing the dispenser part in its mold and showing the mold parts also in section.
Figure 6:
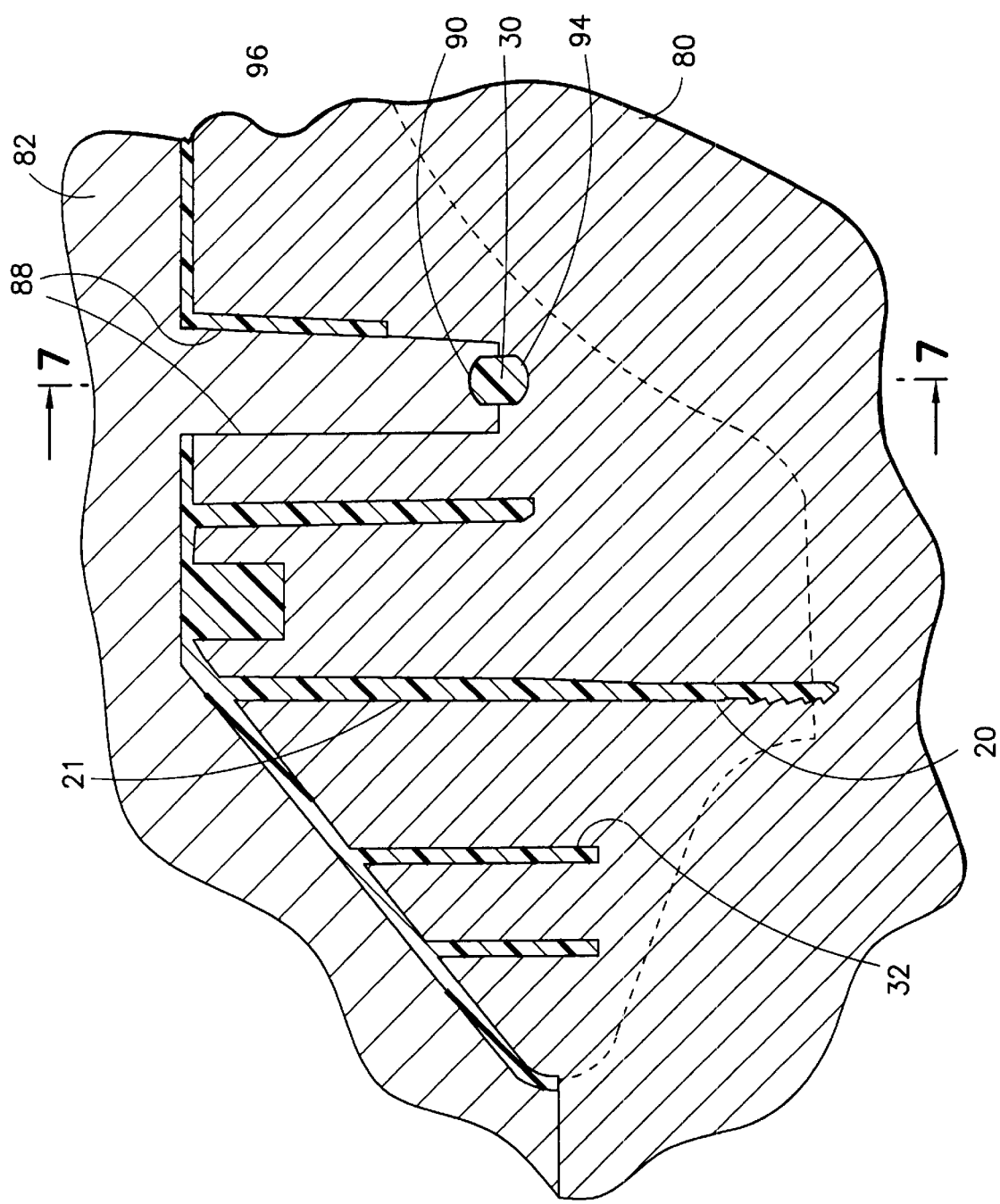
FIG. 6 is an enlarged section comparable to FIG. 3 showing the dispenser part in its mold and showing the mold parts also in section.
Figure 8:
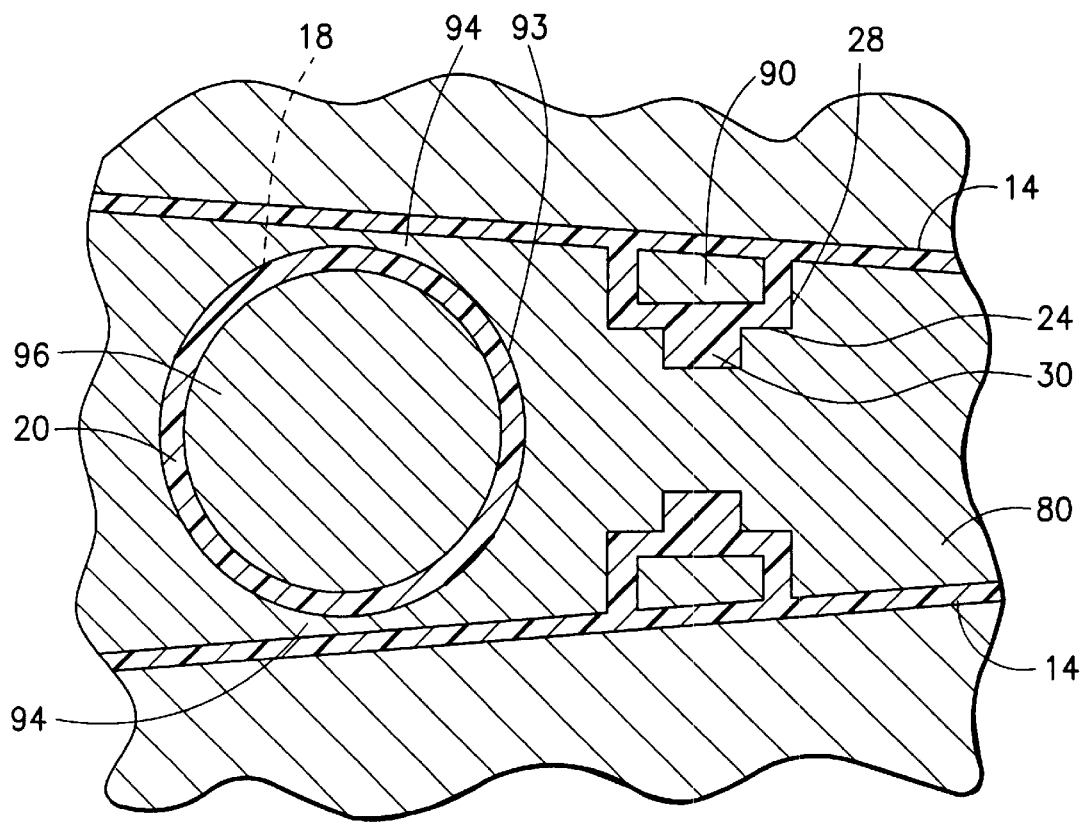
FIG. 8 is a fragmentary sectional view taken on the line 8—8 of FIG. 7.
Figure 9:
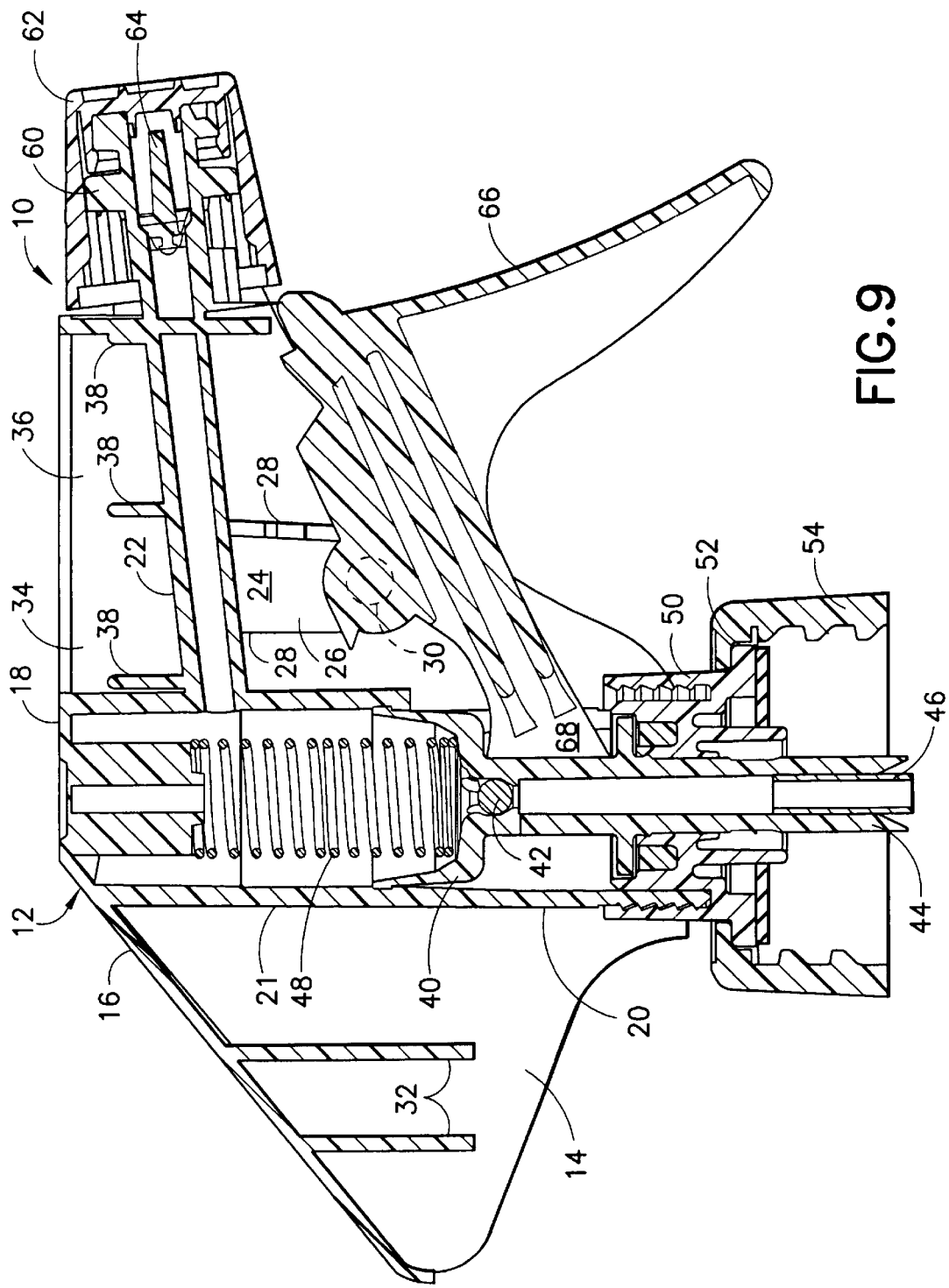
FIG. 9 is a sectional view of a fully assembled pump embodying the one-piece body and housing of the invention.

A pump dispenser including a pump body and housing embodying the invention and made in accordance with the mold and process of the invention is generally designated 10 in FIGS. 1 and 9. The one-piece housing and pump body is designated 12. The housing comprises (FIG. 9) side walls 14, a rear wall 16 and a top wall 18. A coaxial and unitary tubular support 20 and pump cylinder 21 (FIG. 8) is joined to the top and rear walls and is disposed intermediate and spaced from the side walls (FIGS. 4, 8).

A product delivery tube 22 extends forwardly from the pump cylinder. Formed unitarily with the opposite side walls 14 are a pair of channels 24 comprising bridging walls 26 and side walls 28, the more forward of which extends inward from the bridging wall 26 of the channel for the purpose of retaining the trigger. The channels extend vertically along the side walls 14 to the top wall 18 and there terminate in slots 25 (FIG. 1). Disposed at the lower end of the respective channels 24 are the inwardly facing opposed aligned trigger pins 30.

Transverse vertical stiffening webs 32 extend downward from the rear wall 16 (FIG. 9) and run between the two side walls 14. Spaced interior walls 34 run longitudinally vertically of the housing and extend down to the delivery pipe 22 defining a centerline slot 36. Transverse ribs 38 stiffen the interior walls 34.

As shown in FIG. 9, the pump cylinder is provided with a piston 40 having a built-in inlet ball check 42 and a downward tubular stem 44 which telescopingly engages a dip tube 46. A spring 48 inside the pump cylinder biases the piston downward. The lower end of the tubular support 20 engages the retainer 50 and the retainer has a central opening which slidably receives the piston stem 44. The retainer has a flange 52 on its lower end which lies inside the screw cap 54 and is adapted to be clamped against the finish of a container in the conventional way (see McKinney U.S. Pat. No. 4,161,288).

The forward end of the delivery tube 22 is formed with a nozzle hub 60 onto which a nozzle cap 62 snaps and is rotatably held in a well known manner. An outlet check valve 64 of the type disclosed in the Smolen, Jr. U.S. Pat. No. 5,687,877 is used in the preferred embodiment. A pivoted trigger 66 has side openings (not shown) which snap onto the opposed pins 30 for pivotally mounting it. The yoke 68 at the rearward end of the trigger engages the lower end of the piston 40 to raise it when the trigger is squeezed. The wall 28 overlies the top of the trigger to aid in assembly.

FIGS. 5 through 8 show the pump dispenser body and housing of the invention in the process of manufacture, that is, while still in its mold. The mold comprises the lower half 80 and the upper half 82. Additionally, there is the lateral core pin 84 (FIG. 5) which forms the interior of the delivery tube 22. The mold parts are shaped to produce the unitary body and housing above-described.

Figure 7:
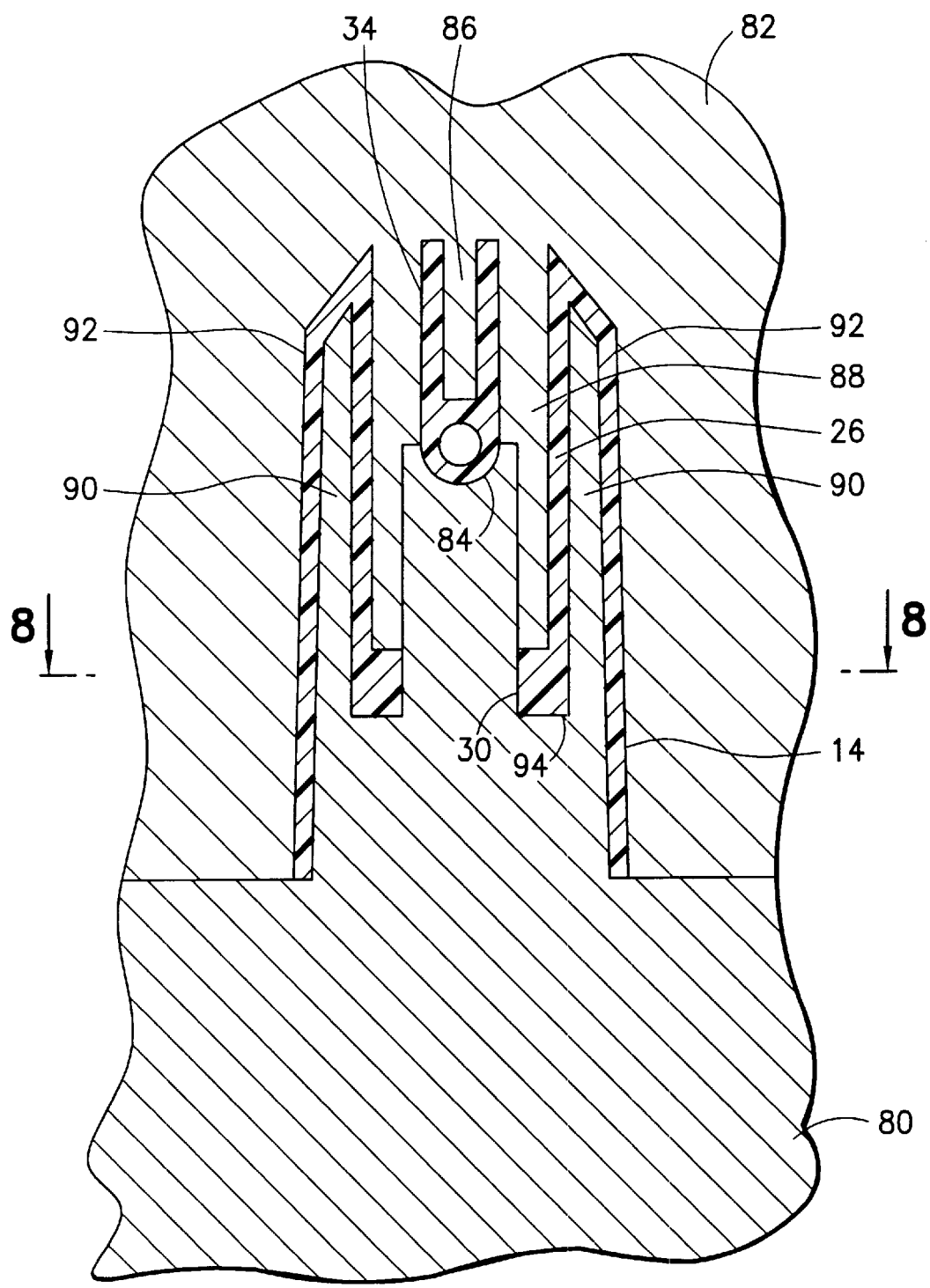
FIG. 7 is a sectional view taken on the line 7—7 of FIG. 6 and showing the dispenser part in its mold.

The molding or coring out of the upper portion of the delivery tube 22 is achieved by the blade 86 (FIG. 5), a downward part of the upper mold half 82. The inner walls 26 of the channels are formed by the flanking blades 88 (FIG. 7). Blades 88 are also integral with the upper mold half 82. The lower portions of the flanking blades 88 are formed respectively with concave shapes 90 (FIG. 6) which serve to shape the upper halves of the trigger pins.

The inside of the channels as described are formed by the outer blades 90 (FIG. 7) which extend upward as part of the lower mold half 80 spaced respectively from cavities 92 in the upper mold half. Inward from the lower ends of the outer blades 90 the lower half 80 is formed with a concave recess 94 which shapes the lower halves of the trigger pins 30 as described. To provide for a retaining wall 28 on the forward wall of the channel 24 there is a cavity 96 (FIG. 6) in the lower mold half 80.

The lower mold half 80 (FIG. 8) is formed with a cylindrical opening 93 to form the outside of the tubular support 20 and pump cylinder 21. It includes a neck portion 94 which spaces the tubular support and pump cylinder 20, 21 from the side walls 14. This has been found necessary to assure that there are no sink marks on the inside of the pump cylinder to impair the pumping ability. A cylindrical shape 96 is formed concentrically within and spaced from the cylindrical opening 93. It forms the inside diameter of the pumping chamber/ tubular support.

The slots 36 and 25 (FIG. 1) left by the blades may remain uncovered and become part of the appearance of the dispenser or, if desired or necessary, they may be covered by an adhesively applied film or strip.

Variations in the invention are possible. Thus, while the dispenser pump body and housing, the mold, and the process have been shown in only one embodiment, it is not so limited but is of a scope defined by the following claim language which may be broadened by an extension of the right to exclude others from making, using or selling the invention as is appropriate under the doctrine of equivalents.

What is claimed is:

1. A pump dispenser comprising a one-piece unitary molded pump body and housing, the housing defined by a pair of spaced side walls and a top wall and inclined rear wall connected to the side walls, a vertically disposed tubular support and pump cylinder spaced from the side walls and unitary with and meeting the top wall, the interior of the side walls being each formed with inwardly extending box-like channels, the channels being forward of and paralleling the pump cylinder and disposed opposite each other, the channels being formed with coaxial inward trigger pins.

2. A pump dispenser as claimed in claim 1 including a delivery tube extending from an upper portion of the pump cylinder and unitary therewith, an upper portion of the delivery tube defined by the lower end of a centerline slot extending down from the top wall of the housing, the slot being defined by spaced opposed walls.

3. A pump dispenser as claimed in claim 2 wherein a plurality of reinforcing webs extend between the spaced opposed walls.

4. A pump dispenser as claimed in claim 2 wherein the top wall is formed with offset slots flanking the centerline slot, the offset slots being the upper terminals of openings in the box-like channels.

5. A pump dispenser as claimed in claim 1 wherein the channels are formed with an inward trigger retaining wall portion.

6. A pump dispenser as claimed in claim 1 wherein a rear portion of the housing under the rear wall is an upward opening.

7. A pump dispenser as claimed in claim 6 wherein a plurality of reinforcing webs extend from the rear wall down into the upward opening.

8. A method for making a one-piece trigger sprayer housing and pump body unit, the method comprising:
   a. providing top and bottom mold sections having, when closed, a cavity which is the shape of the unit,
   b. forming a tubular support and pump chamber on a vertical axis by injecting plastic between a cylindrical surface on the bottom mold section and a cylindrical opening in the bottom mold section surrounding said cylindrical surface,
   c. forming a delivery tube with a horizontal axis in the forward portion of the unit by injecting plastic between a retractable core pin engaging the cylindrical exterior surface and portions of the top and bottom mold sections, the top mold section including a centerline blade to form the top of the delivery tube spaced down from the top wall,
   d. forming a top wall and rear wall of the housing and side walls of the housing, the side walls being spaced from the tubular support and pump chamber by injecting plastic between the top and bottom mold sections,
   e. forming interior vertical box-like parallel channels on the inside of the housing including inward opposed trigger pins on the channels by injecting plastic between top and bottom mold sections including blades extending up from the bottom mold sections, and parallel spaced blades extending down from the top mold section, and
   f. separating the top and bottom mold sections and the core pin and removing the unit.

* * * * *